Inventors
GEORGE OFFUTT
WILLIAM M. BRINER

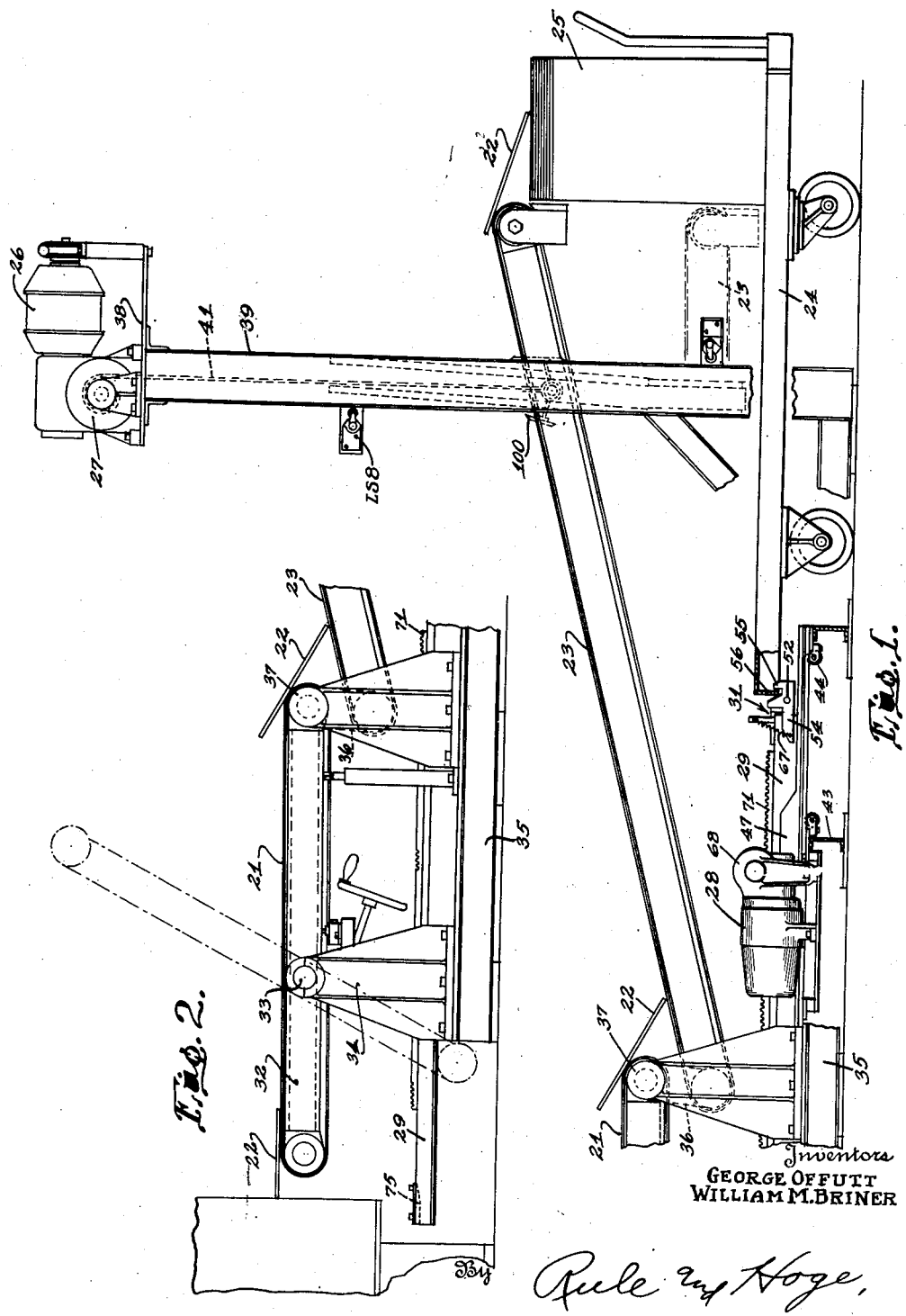

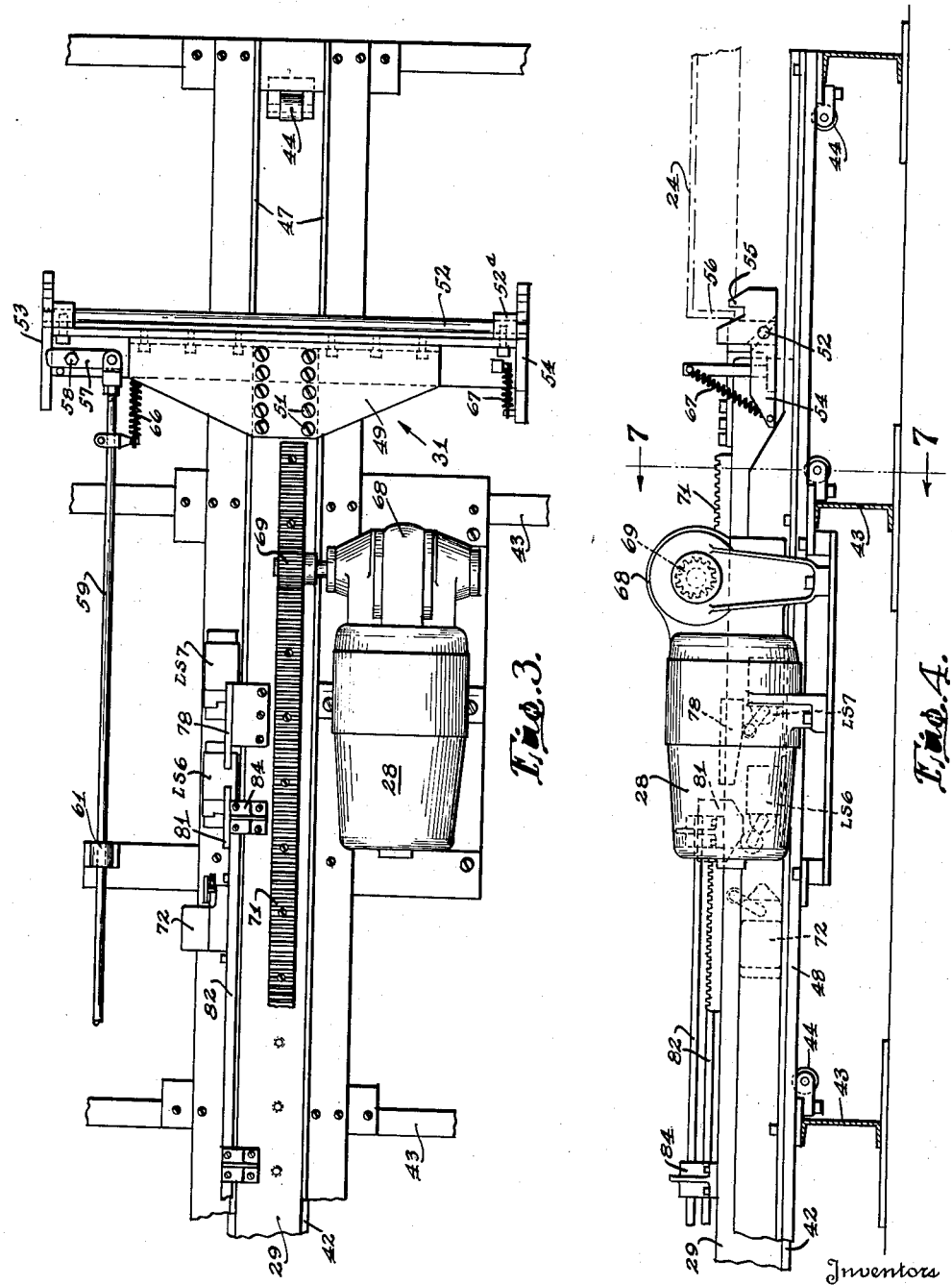

By Rule & Hoge.
Attorneys

Inventors
GEORGE OFFUTT
WILLIAM M. BRINER

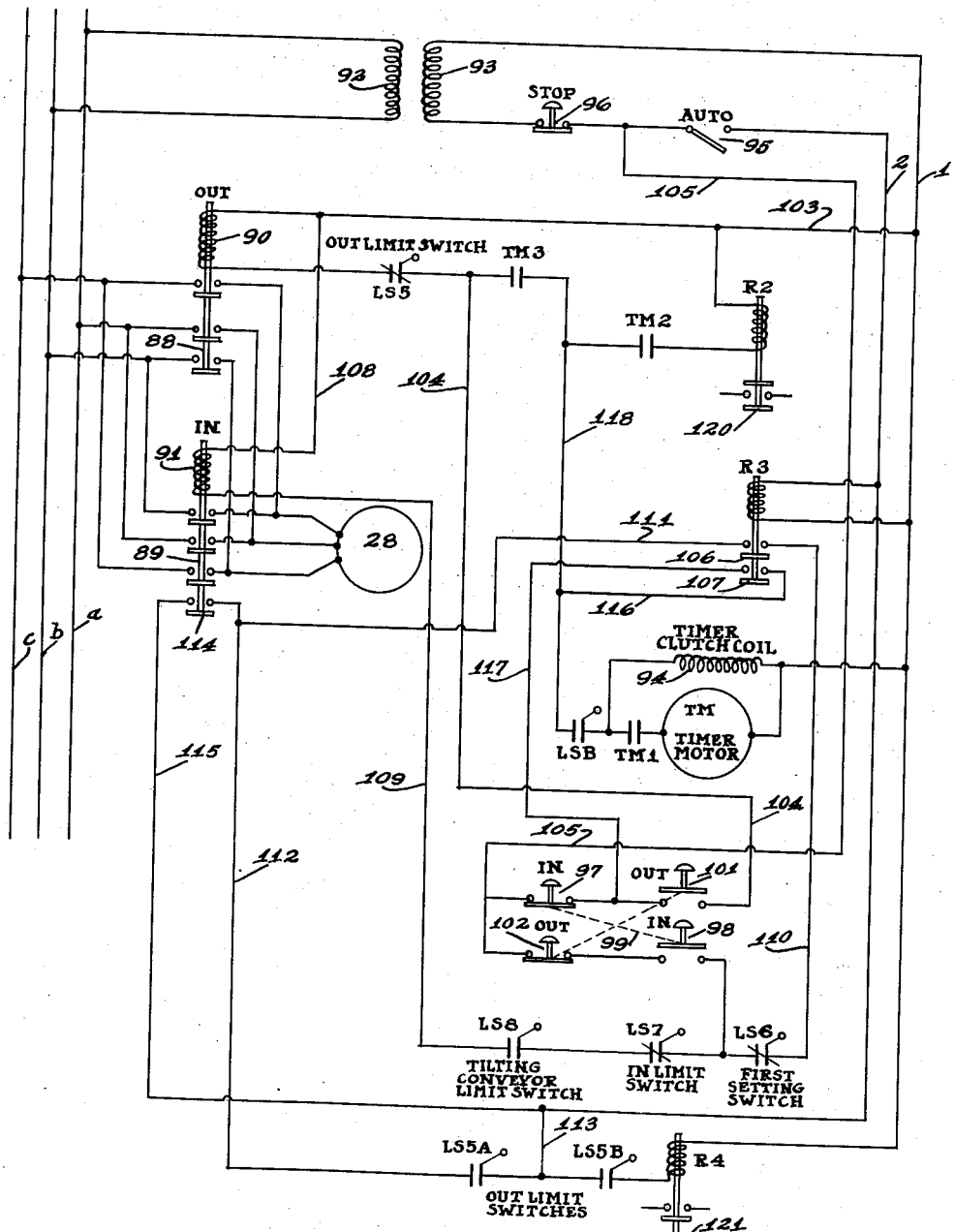

Patented June 16, 1953

2,642,221

UNITED STATES PATENT OFFICE 2,642,221

TRUCK INDEXING MECHANISM

George Offutt and William M. Briner, Streator, Ill., assignors to Owens-Illinois Glass Company, a corporation of Ohio Application January 21, 1949, Serial No. 71,801

9 Claims. (Cl. 254—35)

Our invention relates to apparatus designed for use in loading trucks and provides means for automatically moving a truck intermittently step-by-step during the loading operation.

The invention in the preferred form herein illustrated is particularly adapted for use in connection with, and as forming a part of apparatus for loading pieces of sheet material onto a truck, said apparatus being designed to stack the material on the truck in a plurality of tiers or stacks which are built in succession on the truck and positioned side by side thereon.

An object of the invention is to provide power mechanism, automatically controlled by the stacking apparatus, for positioning the truck to receive the first stack of sheets and thereafter shifting the truck as each stack is completed, into position to receive the next succeeding stack.

A further object of the invention is to provide in combination with a truck, a motor having a stationary mounting, and means for operatively connecting the truck to the motor and intermittently driving the motor for periodically shifting the truck during the loading operation.

Other objects of the invention will appear hereinafter.

Referring to the accompanying drawings:

Fig. 1 is a part sectional side elevation of a portion of an apparatus embodying the present invention.

Fig. 2 is a similar view of the remaining or left-hand portion of the apparatus, comprising a horizontal conveyor; Figs. 1 and 2 together showing the entire apparatus.

Fig. 3 is a plan view on a larger scale of the ram, its driving motor and associated parts.

Fig. 4 is a side elevation of the same.

Figure 10:
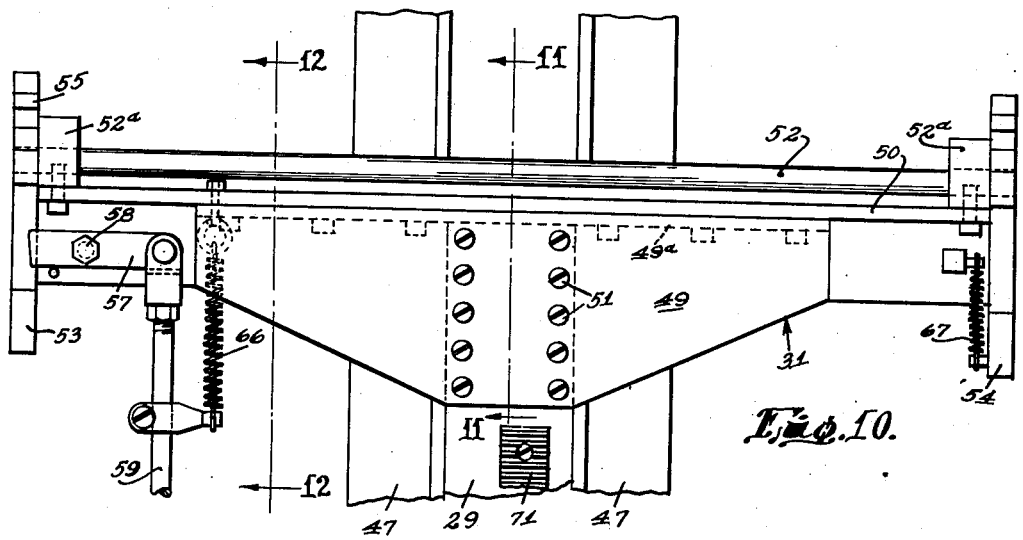
Fig. 10 is a plan view of the latching head at the forward end of the ram.
Figure 12:
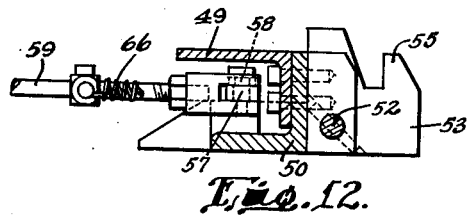
Figure 11:
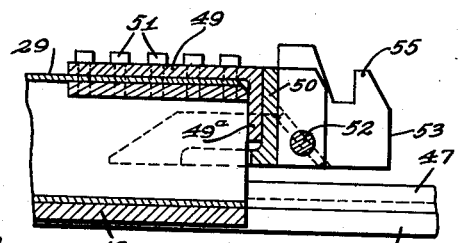

Figs. 11 and 12 are sections at the lines 11—11 and 12—12 respectively on Fig. 10.

Figure 13:
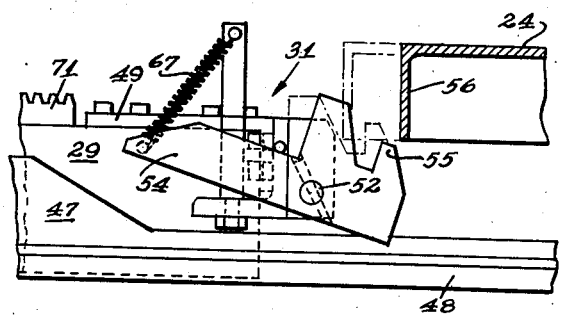

Fig. 13 is a fragmentary view showing particularly one of the hooking levers for coupling the ram head to the truck.

Fig. 14 is a wiring diagram of the electrical apparatus.

Referring to Figs. 1 and 2, the apparatus comprises, in general terms, a horizontally disposed endless belt conveyor 21 to which pieces 22 of sheet material are fed; an elevating conveyor 23; a truck 24 on which the material is loaded, the sheets 22 as they are delivered from the conveyor 23, being stacked in tiers or stacks 25; hoisting mechanism for swinging the elevating conveyor 23 upwardly during the formation of the stack, said hoisting mechanism including an electric motor 26 and a hoisting drum 27; a truck-driving motor 28; a ram 29 driven thereby; a coupling head 31 on the ram for coupling the motor to the truck; and automatic control devices for controlling the operations of the motor 28.

The horizontal conveyor 21 includes a conveyor frame 32 provided with trunions 33 mounted in standards 34 on a supporting framework 35, the construction permitting the conveyor to be swung from its operative position to an inclined position as shown by broken lines (Fig. 2). The lower end of the elevating conveyor 23 is supported in hangers 36 adapted to swing about the axis of the conveyor roll 37 thereby permitting the forward end of the conveyor 23 to be lifted in an approximately straight vertical path during the stacking operation so that the workpieces 22 can be built into vertical stacks. The hoisting motor 26 and drum 27 having driving connection therewith through speed reduction gearing, are mounted on a platform 38 on the upper end of standards 39. A cable 41 wound on the drum 27 is connected to the frame of the conveyor 23 for lifting and lowering the conveyor. The conveyors 21 and 23 may be driven by electric motors (not shown) which together with the motor 26 are automatically controlled for driving the conveyors and hoisting and lowering the elevating conveyor.

The conveyors, hoisting mechanism, their driving motors, and the automatic controlling mechanism therefor may be the same as disclosed in the co-pending application of Wilske et al. for Apparatus for Conveying and Stacking Box Blanks, Serial No. 47,774, filed September 4, 1948.

The ram 29 for driving the truck is mounted directly beneath the elevating conveyor 23. The ram as shown in cross-section (Figs. 7 and 9) is in the form of a rectangular tube to which is bolted a bottom plate 42. The ram is mounted for horizontal reciprocating movement on the supporting frame 35 which includes cross members 43 in the form of angle irons. The ram is directly supported on rolls 44 mounted on the cross-members 43. A guideway in which the ram reciprocates is formed by angle bars 47 bolted to longitudinal plates 48 (Fig. 7) forming part of the supporting frame.

The latching head 31 includes a plate 49 (Figs. 10 to 13) secured to the forward end of the ram by bolts 51. The plate 49 is formed with a depending flange 49a to which is bolted an angle bar 50. The latching head is designed to be attached to the truck by means of a plurality of latching levers 53 and 54 secured to a rock shaft 52 extending lengthwise of the head 31 and mounted for rocking movement in bearing blocks 52a bolted to the angle bar 50 at opposite ends thereof. Each of the latching levers 53 and 54 is formed with a nose 55 or hook to engage beneath the lip 56 of the truck. The latching levers are held in latching position by means of a locking lever 57 mounted on the head 31 to swing about a pivot 58, one end of the lever 57 projecting over the latching lever 53 as shown in Figs. 3 and 10.

Figure 5:
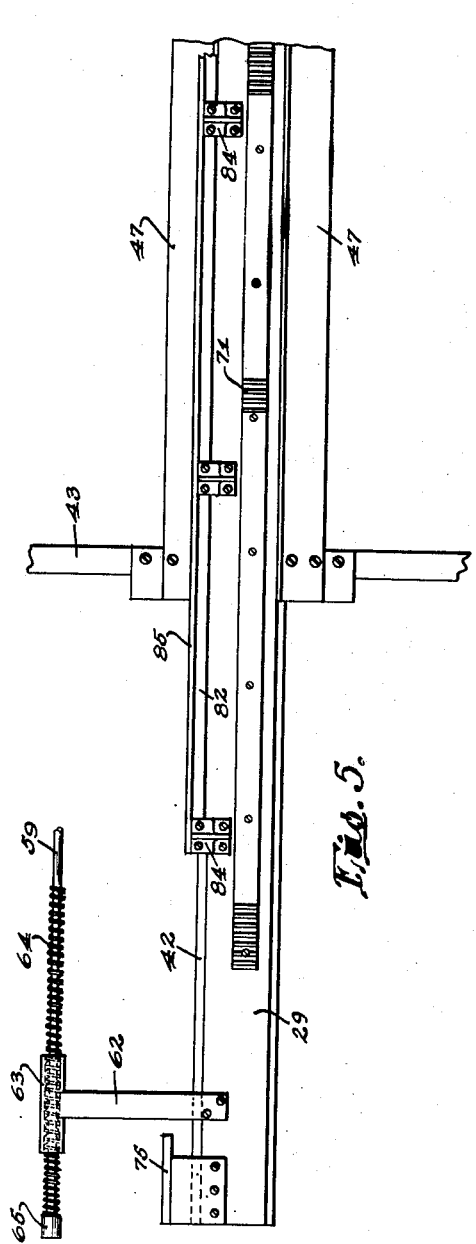
Fig. 5 is a fragmentary plan view showing a portion of the ram.

Means for operating the locking lever 57 includes a rod 59 extending parallel with the ram and connected at its forward end to the lever 57. The rod is mounted for lengthwise movement with the ram and extends through a stationary bearing lug 61 (Fig. 3). An outrigger 62 (Fig. 5) attached to the ram 29 is provided with a tubular bearing 63 through which the rod 59 extends. A coil spring 64 mounted on the rod 59 extends through the bearing 63 and is freely slideable therein together with the rod 59. A head 65 on the rod, forms an abutment for the spring. A coil spring 66 (Figs. 3 and 10) is attached at one end to the coupling head 31 and at its opposite end to the rod 59 and applies a forward tension to the rod for holding the locking lever 57 in its locking position.

When the ram is moved forward and approaches the limit of its forward movement, the spring 64 engages the bearing lug 61 so that the continued movement of the ram places the spring 64 under compression, causing the spring to exert a rearward pull on the rod 59. The forward pull of the spring 66 is thereby overcome and the locking lever 57 swung about its pivot into position to release the latching lever 53. When the latter is released, a coil spring 67, attached to the lever 54 and held under tension, operates to rock the shaft 52 and latching levers to a tilted position (Fig. 13) thereby releasing the coupling head 31 from the truck. The loaded truck is thus released as the ram completes its forward movement and may then be withdrawn and replaced by an empty truck.

The motor 28 has driving connection with the ram through a gear train including speed reduction means 68 and a pinion 69 running in mesh with a rack 71 bolted to the ram and extending lengthwise thereof.

The means for automatically controlling the stopping and starting of the motor 28 and effecting other controls as hereinafter described, includes a limit switch mechanism 72 (Figs. 4 and 8), referred to as the out-limit switch mechanism and comprising out-limit switches LS5, LS5A, and LS5B. These switches are actuated simultaneously when the ram reaches the limit of its outward movement. A limit switch LS7 (Fig. 8) referred to as an in-limit or over-travel switch, is operated to stop the motor when the ram reaches its innermost position. A limit switch LS6 referred to as the first setting switch, operates to stop the motor when the truck is in position for receiving the first stack 25.

Figure 6:
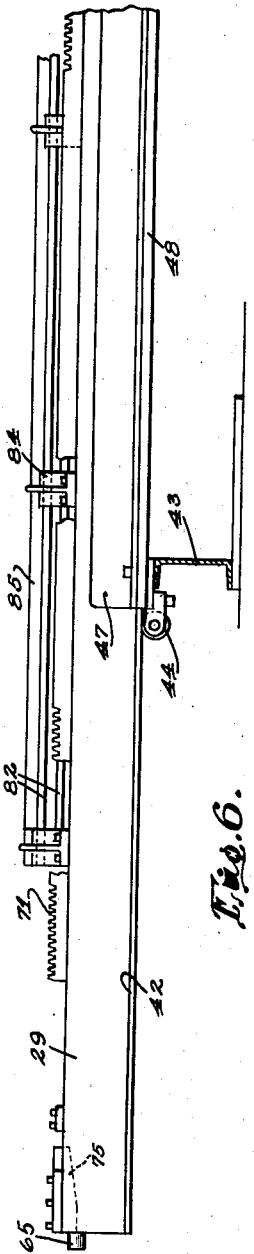
Fig. 6 is a side elevation of the same.

The switch mechanism 72 and switches LS6 and LS7 have a stationary mounting on one of the angle bars 47. The out-limit switch device 72 is actuated by a cam 75 (Figs. 5 and 6) mounted on the ram at the end thereof remote from the coupling head. As the ram completes its outward movement, the cam 75 engages a roll 76 on the switch arm 77 for actuating the out-limit switches as hereinafter described. The in-limit switch LS7 is actuated in like manner by a cam 78 (Fig. 8) attached to the ram 29, said cam operating the switch arm 79. The first setting switch LS6 is actuated by a cam 81 mounted for adjustment lengthwise of the ram.

Figure 7:
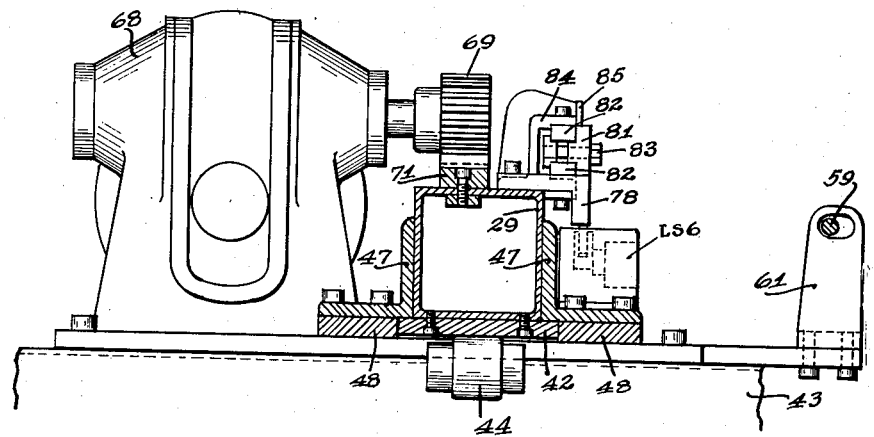
Fig. 7 is a cross-section at the line 7—7 on Fig. 4, showing the motor and ram.
Figure 8:
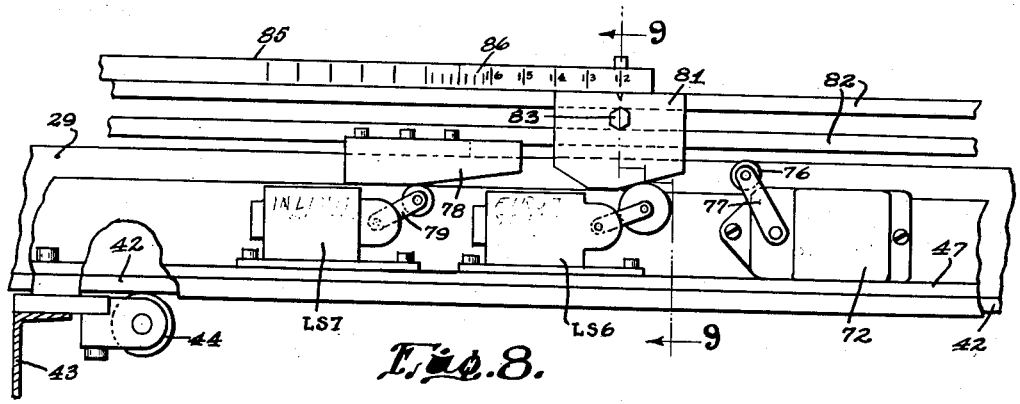
Fig. 8 is a fragmentary side elevation showing certain of the limit switches and other electrical control devices.
Figure 9:
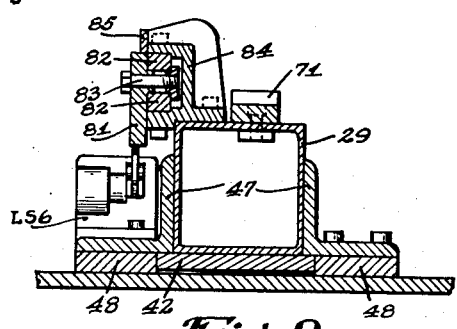
Fig. 9 is a section at the line 9—9 on Fig. 8.

As shown in Figs. 7, 8 and 9, the cam 81 is mounted on a pair of parallel spaced rails 82 and clamped in adjusted position by a bolt 83 extending between said rails. The rails are carried on brackets 84 bolted to the ram 29. A scale bar 85 with graduated markings 86 is mounted on the brackets 84 for indicating the position to which cam 81 is adjusted. The position of adjustment will depend on the width of the strips 22 forming the stack 25.

Referring to the wiring diagram, Fig. 14, current for operating the motor 28 and the control mechanisms, is supplied from the mains a, b, and c in a three-phase system. The starter for the motor 28 comprises an "out" starter switch 88 and an "in" starter switch 89 actuated respectively by coils 90 and 91. The switch 88 when closed, starts the motor in the direction to move the loaded truck outwardly. The switch 89 when closed, effects moving of the truck inwardly to the loading position, Fig. 1.

The controlling devices receive current from the secondary of a transformer comprising a primary coil 92 and a secondary coil 93. The control devices include a timer comprising a timer motor TM with a timer clutch magnet coil 94. The timer is known as a reset type timer having a timing cycle which in the present invention is started by the closing of a limit switch LS8 as hereinafter described. A limit switch LS8 (Fig. 1), is actuated by a cam 100 on the conveyor 23 when the latter reaches the upper limit of its tilting movement.

Relays in the control circuits include a relay R2 which when the timer motor "times out" operates to close a circuit controlling the hoisting motor 26 and starts it in a direction to lower the conveyor 23. A relay R3 operates to set the mechanism for automatic operation, when the "automatic" switch 95 is closed. A push-button stop switch 96 when opened, cuts off current from all of the controls and stops the motor. Push-button "in" switches 97 and 98 are operative to close a circuit for the motor starter coil 91, said switches being tied together as indicated at 99 for simultaneous operation. "Out" push-button switches 101 and 102 are operative in like manner to complete a circuit for the starter coil 90.

If the truck is at its inner or an intermediate position, the motor may be started to move the truck outwardly by pressing the "out" push-button 101. This completes a circuit for the motor starter coil 90 which circuit may be traced from the transformer lead wire 1 through wire 103, coil 90, out-limit switch LS5, wire 104, switches 101, 97, wire 105 and switch 96. The starter coil 90 being thus energized, closes the switch 88, so that the motor 28 is started and moves the truck outwardly. As the ram reaches its outward limit of movement, the out-limit switch LS5 is opened, thereby causing the switch 88 to open and stop the motor. The truck, if loaded, may be disconnected from the ram and replaced by an empty truck. Assuming the ram with an attached empty truck be at the outward position, automatic operation is initiated by closing the automatic switch 95 and momentarily depressing the "in" push-button 97 (or 98). Closing of the switch 95 actuates the relay R3. Depressing the push button 97 completes a circuit for the "in" starting coil 91, said circuit extending from main 1 through wires 103, 108, coil 91, wire 109, limit switches LS8, LS7, switches 93, 102 and wire 105. The tilting conveyor limit switch LS8 shown open in the circuit just traced, is only closed while the tilting conveyor 23 is at the upper limit of its tilting movement, so that the ram motor 28 can only run in the direction to move the truck inwardly while the conveyor remains in said elevated position.

The circuit for the motor starter coil 91 being closed as described, the motor switch 89 is closed and the motor is started in the "in" direction. The closing of the switch 89 completes a holding circuit for the coil 91 independently of the push button. This holding circuit extends from the main 1, through wires 103, 108, coil 91, wire 109, limit switches LS8, LS7, LS6, wire 110, relay contact bar 106, wire 111, contact bar 114 on switch 89, and wire 115 to main 2.

The motor runs in the "in" direction until the truck reaches its position for receiving the first stack 25 of sheets, at which time the first setting switch LS6 opens and stops the motor. The motor 28 remains at rest while the first tier 25 is being built.

As the elevating conveyor 23 reaches the upper limit of its movement and a tier 25 has been completed, the limit switch LSB is automatically closed. This completes a circuit for the timer clutch coil 94 which circuit extends from main 1 through the clutch coil, limit switch LSB, wire 116, contact 107 of relay R3, wire 117, switch 97 and wire 105. The timer clutch coil is thus energized and operates to close the contacts TM1 and TM3. The closing of the contacts TM3 completes a circuit for the motor starter coil 90, said circuit extending from main 1 through wire 103, coil 90, limit switch LS5, timer contacts TM3, wires 118, 116, relay contact 107, wire 117, switch 97, and wire 105. The coil 90 being energized, closes switch 88 and starts the motor 28 to move the truck outwardly. The closing of the contacts TM1 completes the circuit for the timer motor in parallel with the clutch coil 94 so that the timer motor is started.

When the timer motor "times out," the contacts TM1 and TM3 are opened so that the motor 28 and the timer are stopped. As the contacts TM1 and TM3 are opened, the contacts TM2 are closed, thereby completing a circuit for the relay R2. This circuit extends from main 1 through wire 103, coil of relay R2, contacts TM2, wires 118, 116, contact bar 107, wire 117, switch 97, and wire 105. The relay R2 being energized moves its contact bar 120 into closed position, thereby completing a circuit controlling the hoisting motor 26 and starting it in a direction to lower the starting conveyor 23. The starting conveyor, when it reaches its lowered position, starts to build the next succeeding tier or stack, and as the stack is completed and the conveyor reaches its elevated position, it again closes the limit switch LSB for again moving the truck forward under the control of the timer. These operations are repeated until the truck is fully loaded and brought to its outer position and operates the out-limit switches LS5, LS5A and LS5B so that the motor 28 is stopped with the loaded truck disconnected from the ram as heretofore described.

The limit switch LS5B which is normally open, is closed at the same time as the limit switch LS5A, with the truck moved to its outer position. The closing of the switch LS5B completes a circuit for the relay R4 which thereby lifts its contact bar 121 and opens the circuit of the motor which drives the elevating conveyor 23 and thereby prevents starting of the conveyor when it reaches its lowered position after the truck has been loaded and has reached its "out" position. Before the truck is fully loaded, the contact bar 121 remains closed permitting the continued operation for building successive tiers 25.

Modifications may be resorted to within the spirit and scope of our invention.

We claim:

1. Apparatus for moving a truck, comprising a motor, a ram mounted for lengthwise reciprocating movement, gearing connecting the motor to the ram, means for coupling the ram to the truck, said coupling means comprising a latching lever pivotally connected to the ram and formed with a hook to engage the truck, and automatic means actuated by the movement of the ram for controlling the pivotal movement of said lever and releasing it from the truck.

2. Apparatus for moving a truck, comprising a motor, a ram mounted for lengthwise reciprocating movement, gearing connecting the motor to the ram, means for coupling the ram to the truck, said coupling means comprising a latching lever pivotally connected to the ram and formed with a hook to engage the truck, a locking lever connected to the ram and mounted for movement to and from a locking position in which it holds said latching lever in latching position, and means operated by the movement of the ram to move said locking lever out of locking position and thereby releasing said latching lever.

3. Means for shifting a truck, comprising a motor, a ram mounted for reciprocating movement, gearing providing a driving connection between the motor and ram, a coupling head connected to the forward end of the ram, a rock shaft mounted on said head, a latching lever connected to the rock shaft and adapted for latching engagement with the truck, and automatic means for rocking said shaft and the latching lever to a truck releasing position as the ram completes its forward movement.

4. Means for shifting a truck, comprising a motor, a ram mounted for reciprocating movement, gearing providing a driving connection between the motor and ram, a coupling head connected to the forward end of the ram, a rock shaft mounted on said head, a latching lever connected to the rock shaft and adapted for latching engagement with the truck, a locking device mounted on said coupling head and movable thereon into and out of a locking position for holding the said latching lever in latching position, means operated by the forward movement of the ram to move said locking device out of locking position, and means for rocking said shaft to release the latching lever from the truck.

5. Apparatus for shifting a truck, comprising an electric motor having a stationary mounting, a ram mounted for lengthwise reciprocating movement, a rack attached to the ram, and extending lengthwise thereof, a pinion geared to the motor and running in mesh with said rack, a coupling head attached to the forward end of the ram, a rock shaft journalled in said head for rocking movement and extending horizontally transversely of the ram, latching levers attached to said rock shaft, a locking device for holding the said levers in latching position with the truck coupled thereby to the ram, automatic means for releasing said locking device as the ram completes its forward movement, and spring means for swinging the rock shaft and latching levers to release them from the truck when said locking device is moved to released position.

6. The combination of a ram mounted for horizontal reciprocating movement in the direction of its length, a motor geared to the ram, a coupling head attached to the forward end of the ram, a rock shaft journalled in said head, a latching lever fixed to the rock shaft for swinging movement into and out of an operative position for connecting a truck to the ram, a locking lever pivoted to the coupling head for pivotal movement into and out of position to lock said latching lever in its operative position, a rod attached to the locking lever and extending parallel lengthwise of the ram, a coil spring connected between said rod and the coupling head and operative to swing the locking lever into locking position, a second coil spring mounted on said rod, a stop device in the path of said second spring in position to engage the spring as the ram approaches its forward movement and operative to yieldingly oppose the forward movement of said rod and thereby overcome the tension of said first-mentioned spring and move the locking lever to a released position.

7. The combination defined in claim 6 including electrical control mechanism for controlling the operations of the motor, said control mechanism including outer and inner limit switches, means for automatically actuating said switches when the truck reaches its outer and inner limits of movement respectively, means controlled by the limit switches for stopping the motor, means for causing step-by-step intermittent movement of the motor and truck comprising a timer motor and means for actuating said timer motor.

8. The combination with a truck, of an electric motor horizontally spaced from the truck and having a stationary mounting, a ram geared to the motor and mounted for horizontal lengthwise reciprocating movement, means for energizing the electric motor and causing it to reciprocate the ram while the motor remains stationary, a coupling device connected to the ram and releasably connected to the truck for moving the truck with the ram, and automatic means operated by movement of the ram for releasing the coupling device from the truck when the ram reaches a predetermined position in its horizontal reciprocating movement.

9. The combination with a truck, of a motor having a stationary mounting, a ram geared to the motor and mounted for horizontal, lengthwise reciprocating movement, means for intermittently causing the operation of the motor at predetermined intervals and thereby causing the truck to be reciprocated step-by-step into predetermined positions, a coupling device connected to the ram and connected to the truck for moving the truck with the ram, and automatic means for releasing the coupling device from the truck when the ram reaches a predetermined position.

GEORGE OFFUTT.
WILLIAM M. BRINER.

References Cited in the file of this patent

UNITED STATES PATENTS

| Number | Name | Date |
|---|---|---|
| 1,389,244 | Free | Aug. 30, 1921 |
| 1,712,334 | Durbin et al. | May 7, 1929 |
| 1,945,905 | Kimball | Feb. 6, 1934 |
| 2,395,716 | Biedess | Feb. 26, 1946 |
| 2,473,109 | Schneider | June 14, 1949 |
| 2,477,830 | Sandberg | Aug. 2, 1949 |